Sept. 4, 1928.       C. E. RYAN ET AL       1,683,307
ATTACHMENT IN MOTOR VEHICLES
Filed Oct. 12, 1925      2 Sheets-Sheet 1
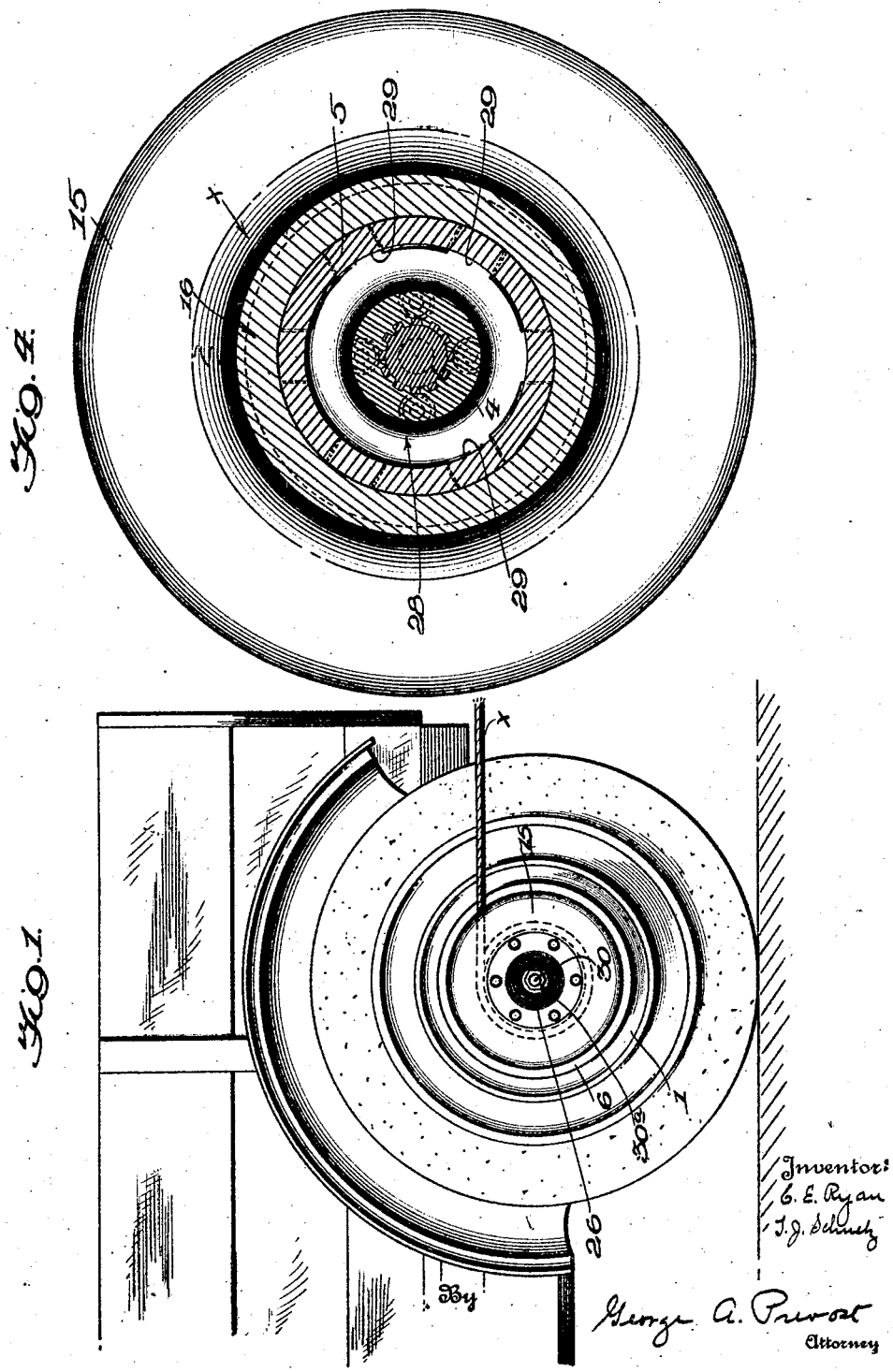
Inventor:
C. E. Ryan
T. J. Schmitz
By George A. Prevost
Attorney

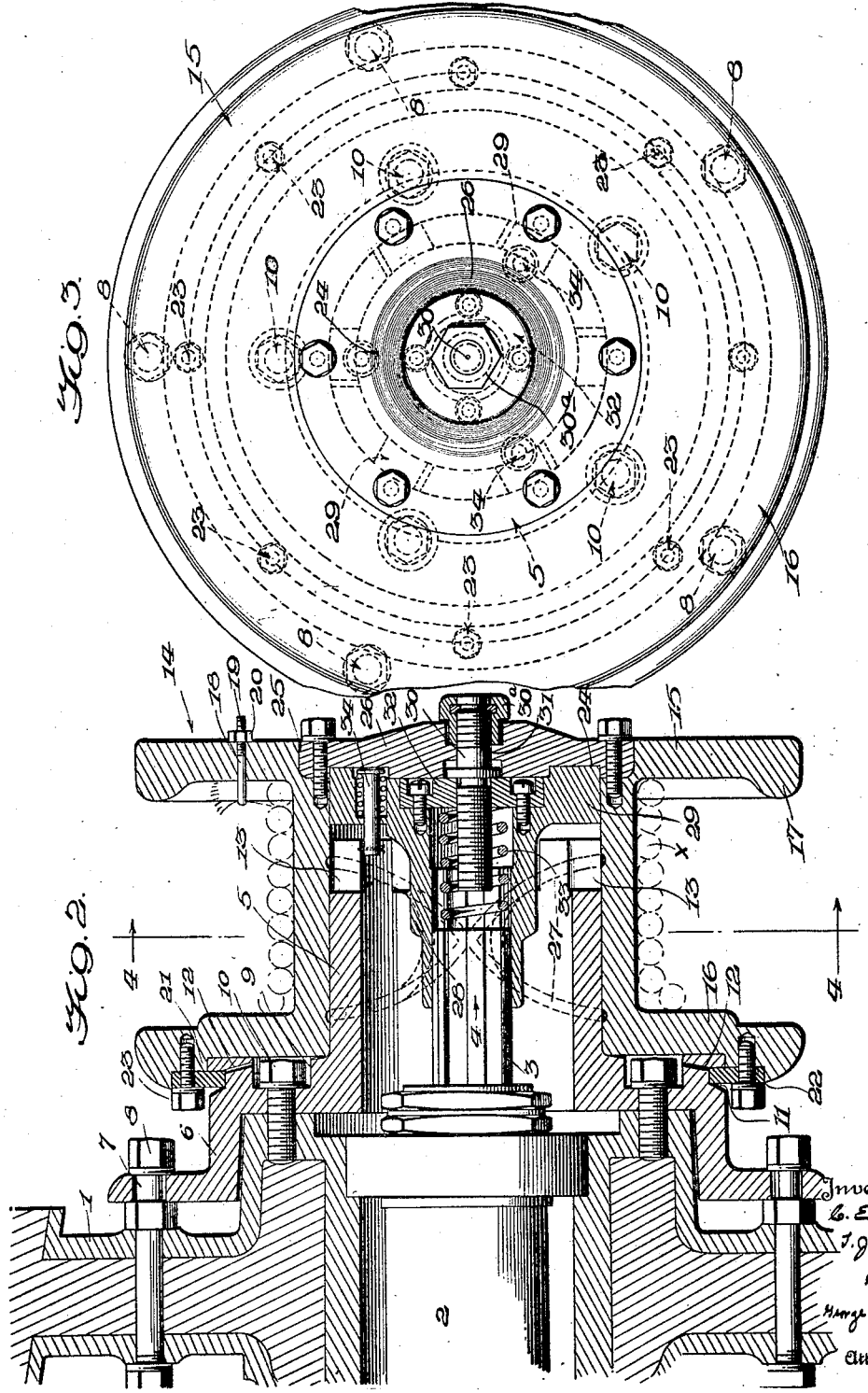

Patented Sept. 4, 1928.

1,683,307

UNITED STATES PATENT OFFICE.

CHARLES E. RYAN AND THOMAS J. SCHUETZ, OF TULSA, OKLAHOMA.

ATTACHMENT IN MOTOR VEHICLES.

Application filed October 12, 1925. Serial No. 62,066.

Our invention consists in new and useful improvements in driving means adapted to be connected to the axle shaft and driving wheel of an automobile or other motor driven vehicles and to be driven by said axle shaft, whereby it is possible to operate mechanism from the driving means connected with said axle without necessitating the jacking up of the rear wheels of the automobile or other vehicle.

The present invention relates particularly to the means of attaching the device to motor trucks and the like which employ heavy metal wheels, and is a modification of our co-pending application Serial No. 62,065.

Another object of our invention is to provide an improved lubricating means for the rotating drum.

With the above and other objects in view which will appear as the description proceeds, our invention consists in the novel features herein set forth, illustrated in the accompanying drawings and more particularly pointed out in the appended claims.

Referring to the drawings in which numerals of like character designate similar parts throughout the several views:

Fig. 1 is a view showing our improved device connected to a vehicle wheel.

Fig. 2 is a sectional view through the wheel and entire device.

Fig. 3 is an enlarged end view of the device, and

Fig. 4 is a sectional view taken on line 4—4 of Fig. 2.

In the drawings 1 designates a motor driven truck wheel of the heavy metal type, 2 the axle housing and 3 the axle shaft which is splined at its outer end as at 4.

5 represents a cylindrical drum bearing adapted to be secured to the outer side of said wheel by means of an integral bowl-shaped hub adapter flange 6 which is bored at its outer edge at 7 to receive special shoulder bolts 8, and bored and countersunk at the inner edge of the flange as at 9 to receive bolts 10. The countersunk apertures 9 are also adapted to serve as oil pockets as will be later set forth. The outer surface of the flange 6 is provided with a circumferentially extending recess 11, which is in communication with each of said oil pockets 9 through an oil port 12. The outer end of the drum bearing 5 is provided with a series of circumferentially extending longitudinal teeth 13 which will be later referred to.

14 represents a cylindrical drum, provided with an outer wall 15 and an inner wall 16. The outer extremity of the wall 15 is provided with a baffle ring 17, and is apertured at 18 to receive a cable clamp 19, comprising a hook-shaped bolt, threaded at one end to engage an adjusting nut 20.

The inner wall 16 is provided at its outer extremity with a circumferentially extending shoulder 21, recessed at the inner extremity of its outer surface to receive a split retaining ring 22, the inner edge of which also fits in the recess 11 in the flange 6, said ring being held in place by bolts 23.

The drum 14 is provided with a series of interior lateral teeth 24 located at the outer end of the drum bearing aperture. The outer wall 15 is recessed at 25, adjacent the teeth 24, to receive a plate 26 which will be referred to later.

The inner bearing surface of the drum 14 is recessed as at 27 to form a "figure 8" oil groove shown in dotted lines Fig. 2. This groove fans the oil back and forth over the surface of the bearing 5 and thoroughly lubricates the same, forcing a certain quantity of oil into the pockets 9 and through the ports 12, to lubricate the retainer 22.

The operating mechaism of this device is identical with that disclosed in our co-pending application Serial No. 62,065, filed October 12, 1925, and comprises a clutch 28 slidably mounted on the end of the splined shaft 3 and adapted to be rotated thereby, having a series of circumferentially extending lateral teeth 29 adapted to alternately engage the hub teeth 13 to rotate the wheel and the drum teeth 24 to rotate the drum. A draw screw 30 having a nut 30ª permanently secured thereon, also disclosed in our aforesaid application, is rotatably secured in an aperture 31 in the plate 26 to engage a threaded aperture in the clutch plate 32, to bring and lock the said clutch in one position or another, when turned in the desired direction. The clutch teeth 29 are all beveled on their inner faces, two of the same being provided with curved or radial outer faces so that when the drum is slightly turned by hand, the pressure of either the center spring 33 in one direction or the ejector pins and springs 34 in the opposite direction, will force said clutch teeth into engagement with said hub or drum teeth, said springs having been put in under compression and with sufficient throw to cause said engagements.

The application and operation of our device is as follows:

The usual axle flange is removed from the truck wheel and the drum bearing 5 is bolted thereto by the same bolts 10. The outer edge of the integral hub adapter flange 6 is bolted to the wheel by special bolts 8. The clutch is placed on the splined end 4 of the axle shaft 3, and the drum placed on the bearing 5 and secured thereon by bolting the split retaining ring 22 in the recess of the shoulder 21. The plate 26 with the draw screw in place is bolted in the recess 25 after said draw screw has been screwed into the clutch plate 32. The cable X is then wrapped on the drum and one end secured in the hook portion of the clamp 19 by tightening the nut 20.

The operation of our invention is identical to that of our aforesaid co-pending application.

By turning the nut 30ª with a suitable wrench in counter clockwise direction the clutch is forced inwardly, due to the pressure exerted by the ejector pin springs, until the angular faces of the clutch teeth abut the outer faces of the corresponding hub teeth. This counter clockwise movement is continued until the flange on the draw screw abuts the flange in the aperture 31, at which time the springs on the ejector pins are partially expanded, exerting a continuous pressure against plate 26 tending to push the clutch member inwardly. The drum is then turned forward by hand until the teeth 29 in said clutch due to their angular inner faces, find their way into alignment with the teeth 13 in the end of the bearing member 5, when the springs of the ejector pins will cause them to engage. The draw screw is again turned in counter clockwise direction until the aforesaid engagement is complete. As the teeth engage, the ejector pin springs are released and the spring 33 in the clutch is compressed.

In this position of the parts the power driven shaft will cause the rotation of the clutch which in turn rotates the rear wheel of the vehicle through the medium of the flange 6.

Now to cause the clutch to disengage the wheel and operate the drum the draw screw is turned in clockwise direction, which movement releases the outward pressure on the plate 26, the clutch being forced outwardly by the spring 33 until the radial clutch teeth abut the corresponding drum teeth 24. The drum is then turned by hand in either direction until said radial clutch teeth find their way into alignment with said drum teeth, when the clutch is forced outwardly by the spring 33 and with it the draw screw, until the draw screw flange abuts the flange in aperture 31.

This clockwise movement is continued until the engagement is complete and the shoulder of the nut on the draw screw abuts the outer edge of the flange in aperture 31 and locks the mechanism.

The shaft 3 will now rotate the clutch which in turn will operate the drum free from the wheels, thus avoiding the necessity of jacking the rear wheels of the vehicle.

From the foregoing it is believed that our invention may be clearly understood without further description, it being borne in mind that numerous changes may be made in the details of construction without departing from the spirit of invention as disclosed in the following claims:

What we claim and desire to secure by Letters Patent is:

1. An attachment for motor vehicles comprising a flange adapted to fit over the hub of the vehicle wheel, means for securing said flange to the hub and to the wheel proper, a sleeve integral with said flange and angularly disposed with relation thereto, a drum rotatably mounted on said sleeve, a split ring adapted to be screwed to said drum and co-act with a recess in said flange, for retaining the drum on said sleeve, means for lubricating the contacting surfaces of said drum and sleeve, means for lubricating said ring and mechanism for rotating the drum free from the wheel and the wheel free from the drum.

2. An attachment for motor vehicles as claimed in claim 1, wherein the means for lubricating the drum and sleeve comprises a "figure 8" groove in the inner surface of said drum, and the lubricating means for the ring comprises a plurality of oil pockets in communication with said recess in the flange.

3. An attachment for motor vehicles comprising a bowl-shaped flange adapted to fit over the hub of the vehicle wheel, countersunk apertures in that portion of said flange adjacent said hub adapted to receive bolts and also to serve as oil pockets, apertures in the outer edge of said flange for wheel bolts, a retaining ring recess in the outer surface of said flange in communication with said oil pockets by a plurality of ports, a sleeve integral with said flange and angularly disposed with relation thereto, a drum rotatably mounted on said sleeve, a retaining ring adapted to be secured to said drum and fit in said retaining ring recess, a "figure 8" oil groove in the inner surface of said drum for lubricating said sleeve and for forcing oil into said oil pockets whereby said ring will be lubricated through said ports.

In testimony whereof we affix our signatures.

CHARLES E. RYAN.
THOMAS J. SCHUETZ.